United States Patent
Polonsky et al.

(10) Patent No.: US 8,447,987 B1
(45) Date of Patent: May 21, 2013

(54) AUTHENTICATION OF BRAND NAME PRODUCT OWNERSHIP USING PUBLIC KEY CRYPTOGRAPHY

(76) Inventors: Katerina Polonsky, Putnam Valley, NY (US); Vladimir Polonsky, Chesterfield, MO (US)

(*) Notice: Subject to any disclaimer, the term of this patent is extended or adjusted under 35 U.S.C. 154(b) by 170 days.

(21) Appl. No.: 12/570,043

(22) Filed: Sep. 30, 2009

Related U.S. Application Data

(60) Provisional application No. 61/199,814, filed on Nov. 20, 2008.

(51) Int. Cl.
*H04L 29/06* (2006.01)

(52) U.S. Cl.
USPC .............................. 713/179; 726/5; 235/440

(58) Field of Classification Search
USPC .............................................. 726/5; 235/440
See application file for complete search history.

(56) References Cited

U.S. PATENT DOCUMENTS

| | | | |
|---|---|---|---|
| 5,640,002 A * | 6/1997 | Ruppert et al. | 235/462.46 |
| 5,963,133 A * | 10/1999 | Monjo | 340/572.1 |
| 6,904,525 B1 | 6/2005 | Berson et al. | |
| 6,996,543 B1 * | 2/2006 | Coppersmith et al. | 705/50 |
| 7,392,953 B2 | 7/2008 | Chu | |
| 7,410,103 B2 | 8/2008 | Nagel | |
| 2003/0009668 A1 | 1/2003 | Chan et al. | |
| 2003/0037240 A1 | 2/2003 | Yamagishi et al. | |
| 2005/0068152 A1 | 3/2005 | Umehara et al. | |
| 2007/0017987 A1 * | 1/2007 | Lapstun et al. | 235/440 |
| 2007/0051816 A1 | 3/2007 | Chu | |
| 2007/0109124 A1 | 5/2007 | Park et al. | |
| 2008/0046263 A1 | 2/2008 | Sager et al. | |
| 2008/0244714 A1 * | 10/2008 | Kulakowski et al. | 726/5 |

* cited by examiner

*Primary Examiner* — Jeffrey Pwu
*Assistant Examiner* — Michael D Anderson
(74) *Attorney, Agent, or Firm* — Law Offices of Ira D. Blecker, P.C.

(57) ABSTRACT

Disclosed is a method of using public key cryptography to determine the authenticity of a brand name product. The brand name product has a unique message personal to the owner of the brand name product and a digital signature which includes at least the encrypted unique personal message. The unique message and digital signature are authenticated using a public key.

23 Claims, 8 Drawing Sheets

AUTHENTICATION OF BRAND NAME PRODUCT OWNERSHIP USING PUBLIC KEY CRYPTOGRAPHY

RELATED APPLICATION

This application is related to and claims priority from U.S. Provisional Patent Application 61/199,814 entitled "Authentication of genuine brand name products using public-key cryptography", filed Nov. 20, 2008, the disclosure of which is incorporated by reference herein.

BACKGROUND OF THE INVENTION

The present invention relates to the authentication of brand name products and, more particularly, to the authentication of brand name products by providing a tag that has unique information personal to the owner of the brand name product and which has a digital signature to authenticate the unique information.

Counterfeiting and forgery of goods are well known problems. Manufacturers of brand name goods such as watches, luggage, handbags, perfumes, etc. must constantly deal with counterfeiters who produce cheap imitations. Counterfeiting causes significant loss of revenue to producers of the brand name goods. Accordingly, a solution to stem the flow of counterfeit goods would be desirable.

There are a number of solutions that have been proposed by others.

Berson U.S. Pat. No. 6,904,525 discloses a method for verifying the source of an article. The label can include a brand name, serial number, reseller, etc. The label also includes encrypted information which is digitally signed using a private key.

Chu U.S. Pat. No. 7,392,953 and Chu U.S. Patent Application Publication 2007/0051816 disclose a digital label which stores and displays information about a product, such as brand name and serial number, to which it is attached.

Nagel U.S. Pat. No. 7,410,103 discloses an RFID label, one part of which is used for product identification.

Yamagishi et al. U.S. Patent Application Publication 2003/0037240 A1 propose embedding an ID chip into a brandname product. The invention relies on communication between the ID chip and an ID management center.

Umehara et al. U.S. Patent Application Publication US 2005/0068152 A1 suggest using encoded ID tags to expedite custom clearance. The invention relies on public key cryptography; therefore it does not require communications with an ID management center. At the same time, it ignores the authentication-related issues outside customs.

Park et al. U.S. Patent Application Publication 2007/0109124 disclose a tag for determining the authenticity of a product and comprises an antenna, power supply unit and an encryption/decryption unit. The tag may be read by placing a suitably enabled reader, such as a cell phone, in proximity to the tag.

Sager et al. U.S. Patent Application Publication 2008/0046263 disclose the labeling of manufactured goods with a digitally verified unique numeric identifier which can be verified by a central checking center through the use of a cell phone interface. Optical character recognition can be used in the practicing of the invention.

The disclosures of each of the foregoing references are incorporated by reference herein.

Whatever the merits, features and advantages of the above cited references, none of them achieves or fulfills the purposes of the present invention.

BRIEF SUMMARY OF THE INVENTION

The various advantages and purposes of the present invention as described above and hereafter are achieved by providing, according to a first aspect of the invention, a method of authenticating an article including obtaining an article by a first person that is produced by a second person, providing a tag by the second person for the article, the tag having printed indicia indicating ownership by the first person and readable by a person, the tag further having a digital signature encrypted by a private key, reading the printed indicia and digital signature with a portable device, and validating the printed indicia and digital signature using a public key.

According to a second aspect of the invention, there is provided a method of authenticating an article obtained by a first person that is produced by a second person including providing a tag by the second person for the article, the tag having printed indicia personal to the first person and readable by a person, the tag further having a digital signature authenticating the printed indicia and encrypted by a private key, reading the printed indicia and digital signature with a portable device, and validating the printed indicia and digital signature using a public key.

According to a third aspect of the invention, there is provided an owner's tag provided with an article owned by the owner, the owner's tag having printed indicia personal to the owner and having a digital signature authenticating the printed indicia and encrypted by a private key.

According to a fourth aspect of the invention, there is provided an article having an owner's tag provided with the article, the owner's tag having printed indicia personal to the owner and having a digital signature authenticating the printed indicia and encrypted by a private key.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
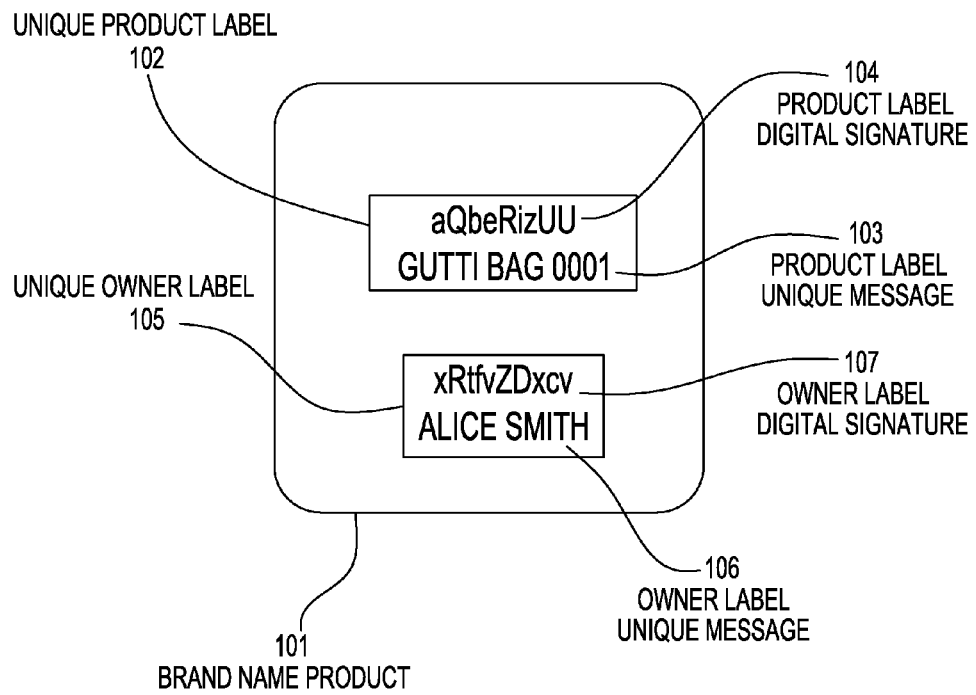
FIG. 1 illustrates a unique product label and a unique owner label.

Referring to the Figures in more detail, and particularly referring to FIG. 1, there is shown a brand name product 101. The brand name product 101 could be any brand name product. Some categories of brand name products contemplated within the scope of the present invention, for purposes of illustration and not limitation, are luggage, handbag, dress, suit, watch, etc. The advantages of the present invention may be extended to works of art and craft such as paintings, jewelry, historic artifacts, etc. and such works of art and craft are deemed to come within the scope of "brand name products". The brand name product 101 carries a unique product label 102 which consists of a unique message 103 and a digital signature 104. Unique message 103 may contain a brand name (e.g. GUTTI), product name (e.g. BAG), and a serial number (e.g. 0001). Additionally, it may contain the name of a retail store the product where the brand name product 101 can be purchased, as well as other relevant information. As its name suggests, all messages are different even for similar products. The unique message 103 is readable by a person without the necessity of using a special reader. The unique message is also encrypted into the digital signature 104. The digital signature 104 may also be encrypted with certain codes that are only known to a manufacturer or reseller of the brand name product 101 or known by the provider of the unique product label 102. Digital signature 104 uses public key cryptography to authenticate the unique message 103. In public key cryptography, information is encrypted by the holder of a private key of a public/private key pair. Certain of the encrypted information, as determined by the holder of the private key, can be read using the public key. The holder of the private key also determines how readily available the public key is. As will be explained in more detail hereafter, it is the intent of the present invention to have the public key readily available so that the digital signature 104 can be conveniently read and the authenticity of the unique message 103 readily determined.

Unique product label 102 can be firmly attached to the brand name product 101 such as by sewing or adhering the unique product label 102 to the brand name product 101. The unique product label 102 can also be engraved onto the brand name product 101. The unique product label may also be provided separately with the brand name product 101 such as a hangtag. The unique product label 102 need not be provided to the purchaser of the brand name product 101 at the time the brand name product 101 is purchased and may be provided to the purchaser of the brand name product at a subsequent time as will be described in more detail hereafter.

In addition to, or instead of, the unique product label 102, the brand name product 101 may have a unique owner label 105. The unique owner label 105 has a unique owner message 106 and a digital signature 107. Unique owner message 106 may contain the owner name (e.g. Alice Smith), the name of the store where the product was purchased, and a text provided by the product owner. There may be other information in the unique owner message 106 that is personal and individualized to the owner of the brand name product 101. Additionally, the unique owner label may have a copy of the product unique message 103, in whole or in part. As with the unique product label 102, digital signature 107 uses public-key cryptography to authenticate the unique message 106.

It can be seen that there are various kinds of labels that can be provided for the brand name product 101. In a preferred embodiment of the present invention, a unique owner label 105 is provided which has indicia such as a unique owner message 106. The unique owner message 106 has information that is personal and individualized to the owner, or indicates ownership, of the brand name product 101. In one embodiment of the present invention, the manufacturer of the brand name product 101 could provide the brand name product 101 to a retail store and the unique owner message 106 could indicate, for example, that the brand name product 101 was made especially for the retail store and possibly have some other information on the unique owner label 105 such as a serial number. In another embodiment of the present invention, the manufacturer or reseller of the brand name product could provide the brand name product 101 to the ultimate purchaser of the product, the consumer, and the unique owner message 106 could indicate, for example, the brand name product 101 was made especially for the consumer or otherwise indicate some personal information or ownership of the brand name product 101 by the consumer. In a further preferred embodiment of the present invention, each brand name product 101 provided to each ultimate purchaser may have a unique owner message 106 that is one of a kind and unlike any other unique owner message 106 for any other ultimate purchaser.

Figure 2:
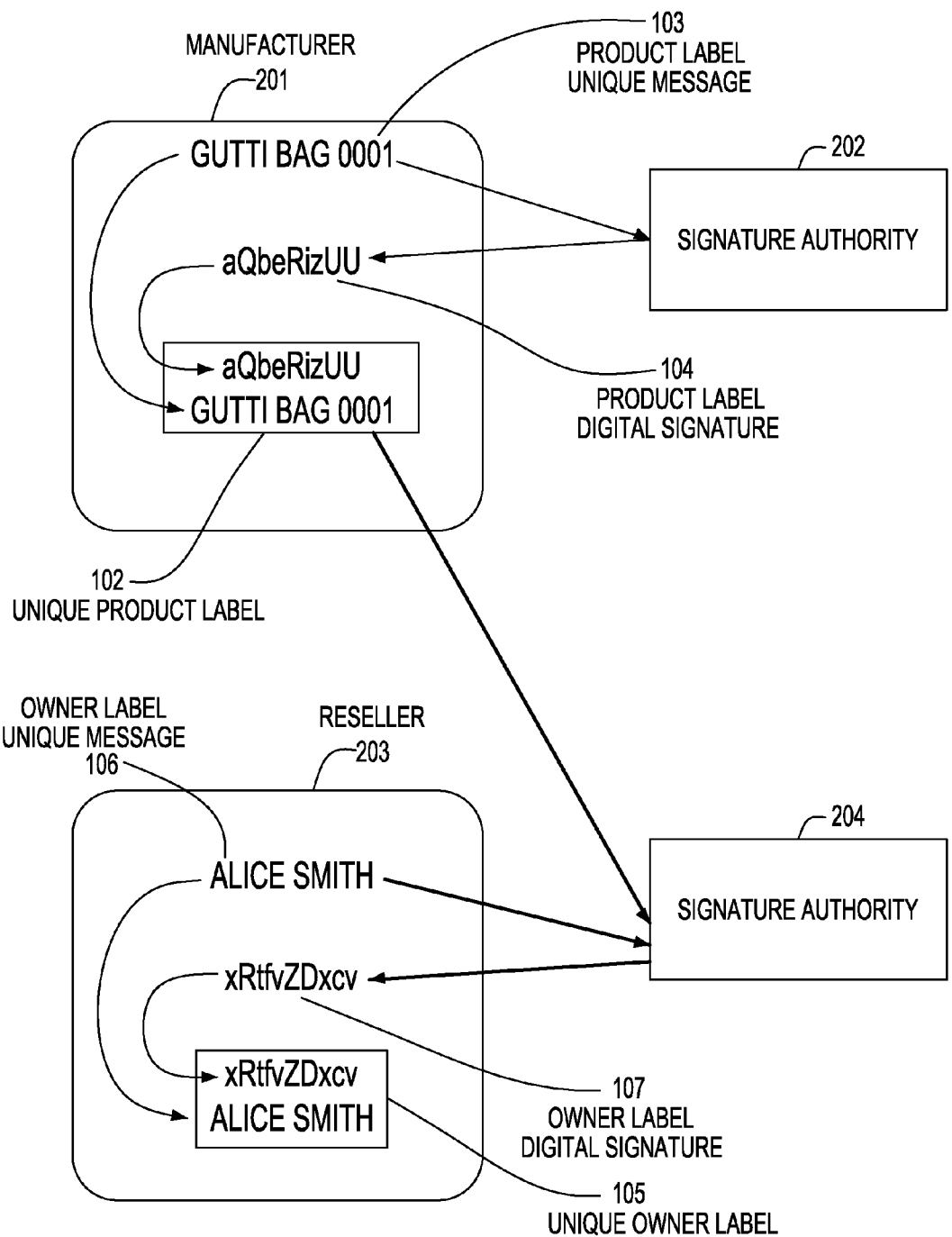
FIG. 2 illustrates the methodology for issuing unique product and owner labels.

The top portion of FIG. 2 illustrates the process of issuing unique labels. Manufacturer 201 composes a product unique message 103 and passes the product unique message to a signature authority 202 which uses public-key cryptography to produce a digital signature 104 for the unique message 103. Signature authority 202 is, basically, a computer program running either on the manufacturer's computer or on some third party trusted computer. Manufacturer 201 combines unique message 103 with digital signature 104 to form a unique product label 102. The product label 102 is printed on a physical carrier (e.g. metal, leather, plastic, paper, etc.) for attachment to the product it identifies or engraved directly on the brand name product 101. As noted earlier, the product label 102 may also be made into a hangtag or some other article for combination with the brand name product 101.

Similar to the manufacturer, the product reseller 203 in the bottom portion of FIG. 2 may compose the owner unique message 106 which may also contain product label unique message 103 or a part thereof. The signature authority 204 uses public-key cryptography to produce a digital signature 107 for the owner unique message 106. Signature authority 204 may or may not coincide with signature authority 202. As noted above, signature authority 204 is, basically, a computer program running on a reseller's computer, or manufacturer's computer, or some third party computer. Similar to the product label, the owner label 105 is produced on a physical carrier, and may be directly attached to the product, or added to the product as a hangtag or similar article, whose owner it identifies.

Referring now to FIG. 3, there are shown preferred embodiments of the present invention wherein owner tags are made having indicia personal and individualized to the owner or otherwise indicating ownership of the brand name article 101. Where conventional labels focus on the manufacturer or seller of the brand name article 101, the unique owner label 105 of the present invention focuses on the purchaser or owner of the brand name article 101 and includes encrypted information that may be personal and individualized to the owner of the brand name article or otherwise indicating ownership of the brand name article 101 by the owner.

Figure 3A:
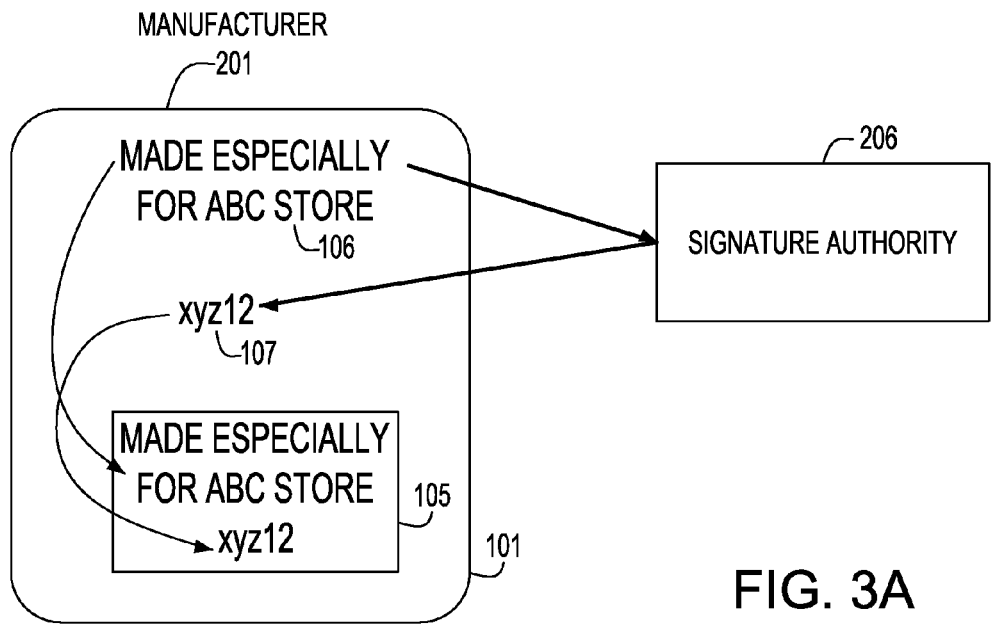
FIGS. 3A and 3B illustrate the methodology for issuing another embodiment of unique owner labels.

Referring first to FIG. 3A, manufacturer 201 receives an owner unique message 106 from the purchaser of the brand name article 101. The owner unique message 106 should contain information that may be personal and individualized to the purchaser of the brand name article 101 or otherwise indicating ownership of the brand name article 101 by the purchaser. Of course, owner unique message could also contain the brand name of the brand name article 101 and other information pertinent to the manufacturer 201. The purchaser could be a reseller or even the ultimate purchaser, the consumer. The manufacturer sends the owner unique message 106 to signature authority 206 which encrypts the owner unique message 106 into digital signature 107. The owner unique message 106 and digital signature 107 are transferred to a suitable substrate for forming a unique owner label 105 which can be directly attached to the brand name article or which can form a hangtag or similar article.

Figure 3B:
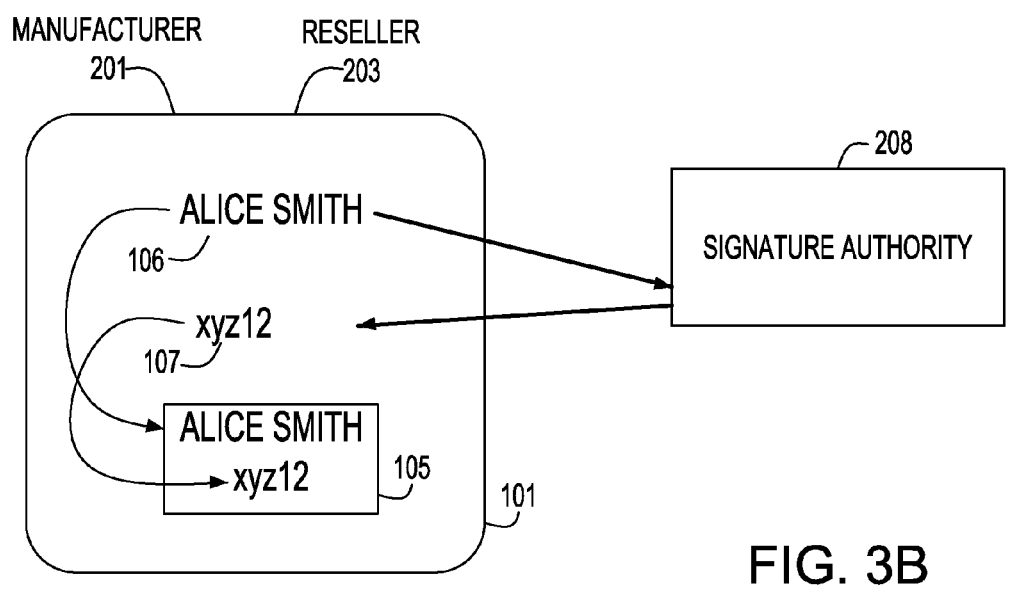

Referring now to FIG. 3B, the unique owner label 105 is formed in the same manner as the unique owner label 105 in FIG. 3A except the owner unique message 106 is supplied to the manufacturer 201 or a reseller 203 by the purchaser of the brand name article 101. The signature authority 208 that encrypts the owner unique message 106 can be the same or a different entity than the signature authority 206.

It is contemplated within the scope of the present invention that the purchaser of the brand name article 101 can have the unique owner label 105 made at the same time that the brand name article 101 is purchased. This could occur, for example, when the purchaser purchases the brand name article 101 from reseller 203 and the reseller 203 has an apparatus in the store for making a suitable unique owner label 105. If the brand name article 101 is ordered from manufacturer 201 or reseller 203, the unique owner label 105 may be ordered at the same time. It is also possible than the unique owner label 105 could be ordered after the brand name article 101 is purchased by the purchaser. For example, the purchaser could purchase the brand name article 101 from the reseller 203 (such as in a store), and then order the unique owner label 105 at the time of purchase for delivery at a later time.

It is contemplated within the scope of the present invention that the manufacturer 201 and reseller 203 could manufacture the unique owner label 105 themselves but it is also within the scope of the present invention for a third party to manufacture the unique owner label 105 for the manufacturer 201 and/or reseller 203.

Figure 4:
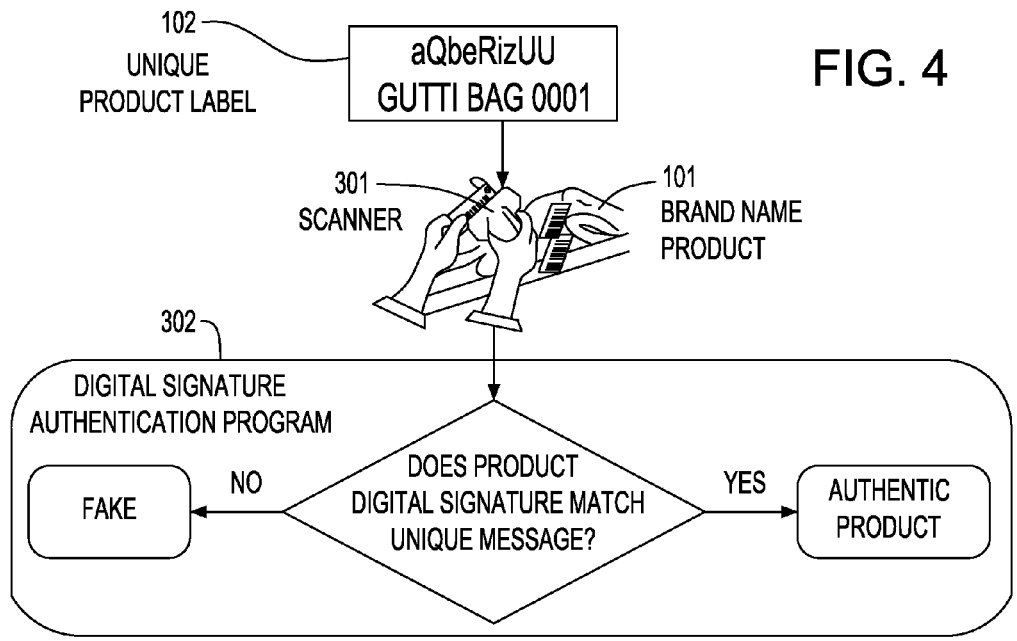
FIG. 4 illustrates brand name product authenticity verification.

FIG. 4 illustrates the process of brand name product 101 authenticity verification. Unique product label 102 is attached to the brand name product 101. Scanner 301 reads the content of the unique product label 102, both unique product message and its digital signature. A suitable device 301, such as a scanner 301 (or a computer it is connected to) runs digital signature authentication program 302 that establishes if the digital signature authenticates the unique product message. Depending on the output of this program the product is identified as an authentic or a fake. The retail store personnel or retail store customers typically practice the process in FIG. 4. In addition to using scanner 301 and locally running authentication program 302, the content of the unique product label 102 can also be transferred electronically (i.e. over the Internet) to a buyer for verification when the brand name product is being sold over the Internet.

Figure 5:
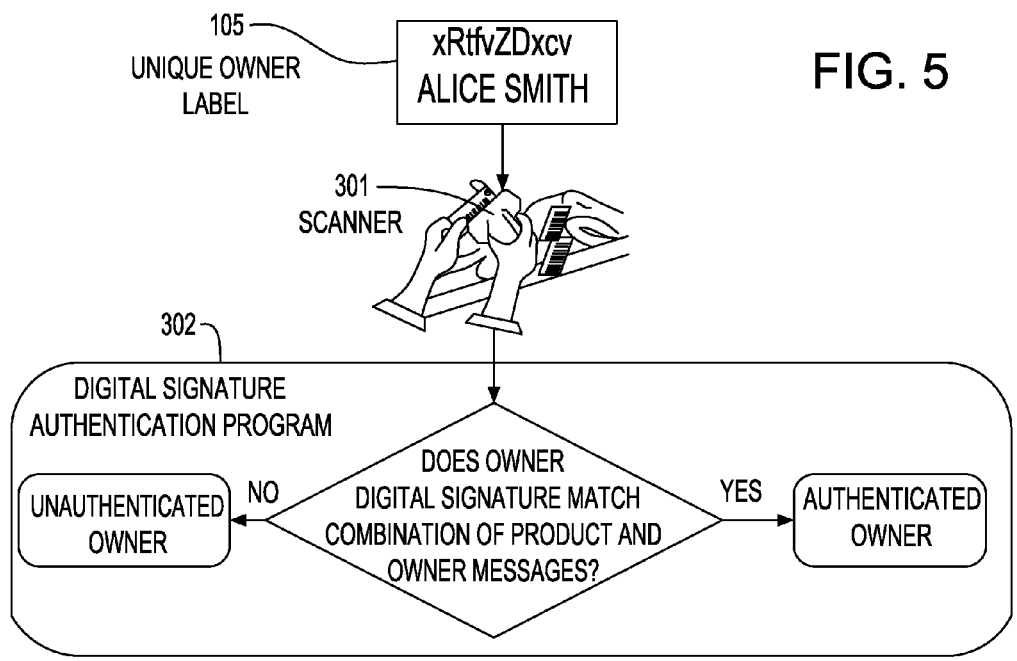
FIG. 5 illustrates brand name owner authenticity verification.

FIG. 5 illustrates the process of the brand name owner authenticity verification. A suitable device 301 that is capable of reading characters and digital signatures, such as a scanner, reads the content of the unique owner label 105, both its unique message 106 and the digital signature 107. Digital signature authentication program 302 uses digital signature 107 to establish the authenticity of the unique message 106. The process illustrated in FIG. 5 may apply when the original owner sells the brand name product 101. As in the case of the product label verification, the content of the owners label can be transferred electronically to a remote buyer for verification.

Figure 6:
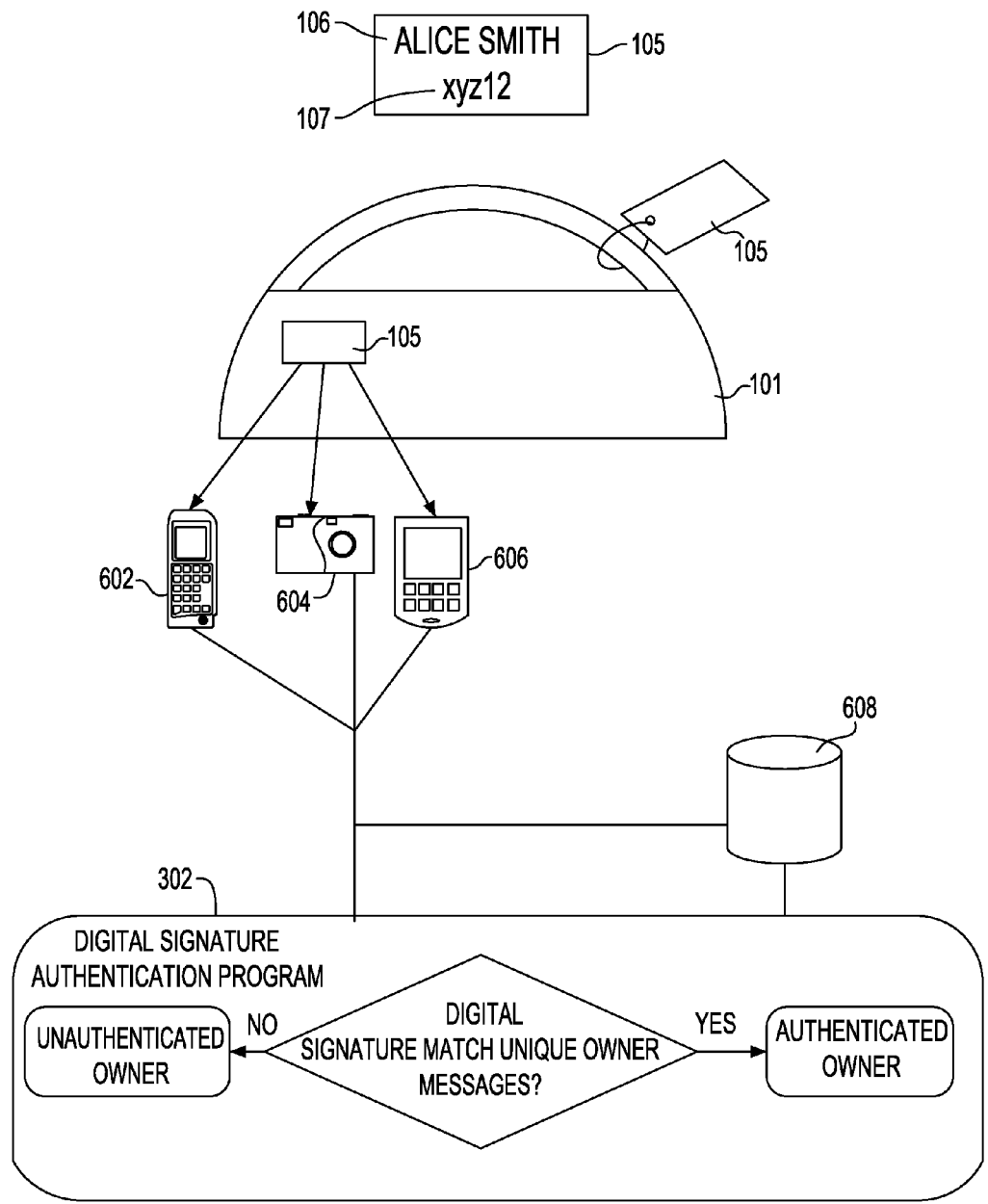
FIG. 6 illustrates another embodiment of brand name owner authenticity verification.

Referring now to FIG. 6, a preferred embodiment of the present invention is illustrated. A unique owner label 105 has been applied to, or engraved on, a brand name product 101, such as a handbag. As noted previously, the unique owner label 105 could have been applied as a hangtag or similar manner. The unique owner label 105 has indicia 106 that is readable by a person without any equipment. In this case, a casual observer could see that "Alice Smith" is the owner of brand name product 101. The unique owner label 105 also has a digital signature 107. A person with a portable piece of equipment such as a cell phone camera 602, camera 604, PDA 606 or similar equipment could take a picture of the unique owner label 105. By suitable technology, such as optical character recognition (OCR), the unique owner label 105 can be "read" and then the authenticity of the unique owner label 105 is determined. By authenticity, it is meant that the decrypted digital signature 107 and unique owner message 106 match. In one embodiment, the portable equipment has previously downloaded the public key from a remote database, such as database 608, so once the unique owner label 105 is read, digital signature authentication program 302 resident in the portable device 602, 604, 606 can determine the authenticity of the unique owner label 105. Authenticity is established when both the decrypted digital signature 107 and unique owner message 106 match, thereby establishing the authenticity of the brand name product 101.

In another embodiment, the public key and digital authentication program 302 are resident in the remote storage 608. In this case, the unique owner label 105 that is read by the portable device 602, 604, 606 is then transmitted to remote storage 608 and then authenticated by use of the public key and digital signature authentication program 302. An indication of whether the unique owner label 105 is authentic is transmitted back to the portable device 602, 604, 606. The person in possession of the portable device 602, 604, 606 would then know whether the brand name product 101 is authentic or not.

Figure 7A:
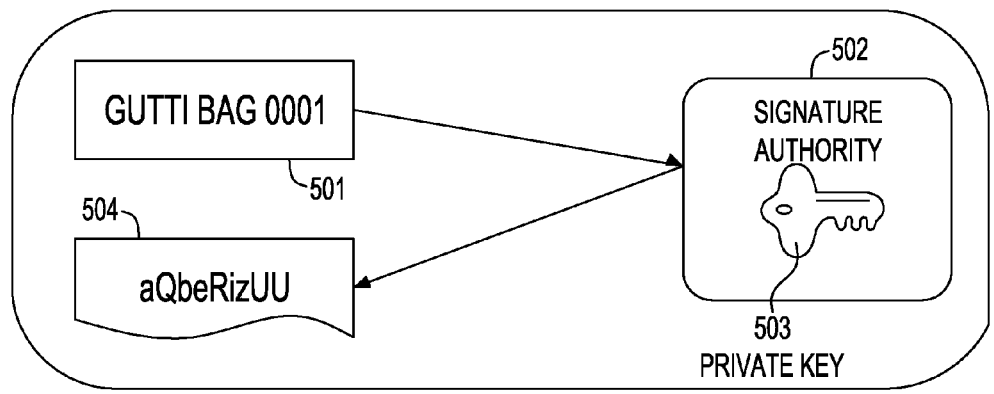
FIGS. 7A, 7B and 7C illustrate using public key cryptography to digitally sign and authenticate unique product and owner labels.
Figure 7B:
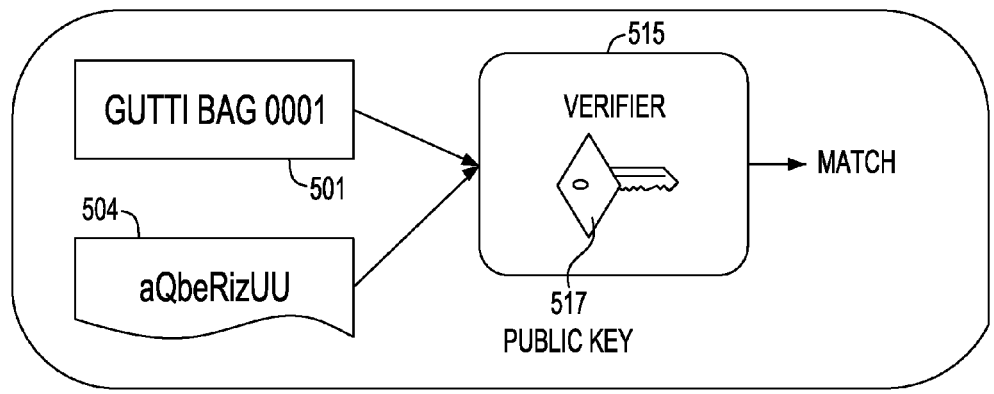
Figure 7C:
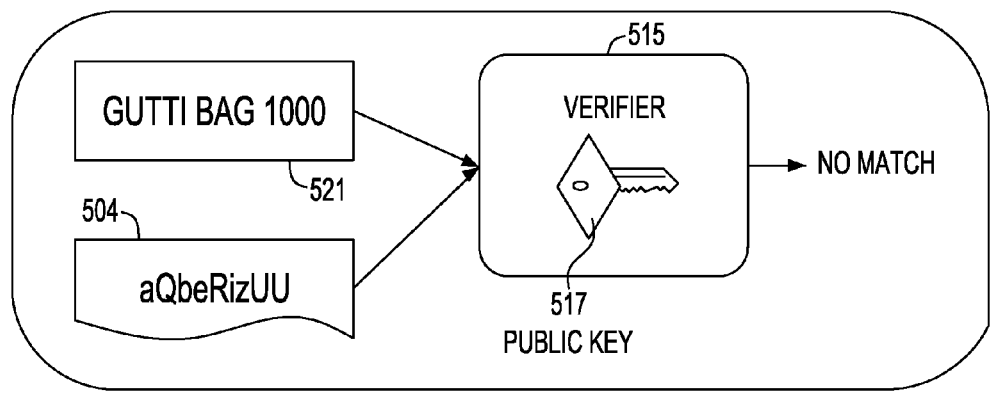

FIGS. 7A, 7B and 7C illustrate using public-key cryptography to authenticate unique product and owner labels. FIG. 7A graphically shows the process for obtaining the digital signature. The signature authority 502 processes unique message 501, relating either to product or owners messages. The signature authority 502 is a computer program implementing public-key cryptography algorithms for digital signatures and uses private key 503 to generate the digital signature 504. The digital signature 504 contains the encrypted unique message 501 and perhaps some other code for encryption purpose. FIGS. 7B and 7C show different situations that can occur when a digital signature authentication program (verifier 515) is applied to unique labels. Referring first to FIG. 7B, when the label consists of a valid unique message 501 and a valid digital signature 504 that contains the encrypted version of the valid unique message 501, the verifier 515 uses public key 517 to confirm their validity. It is possible that the unique message 501 and digital signature 504 separately could be valid but it is only when they are both valid and the content of the unique message 501 and digital signature 504 match that the validity of the label is confirmed.

The signature authority 502 freely distributes public key 517. Programs such as digital signature authentication program 302 (FIG. 6) are also freely distributed.

Referring now to FIG. 7C, shown is the situation when the unique message 521 "GUTTI BAG 1000" is not valid (for example, GUTTI did not produced the bag with such a number) while the digital signature 504 corresponds to a valid unique message 501. The verifier 515 does not match 521 and 504. Retail store personnel or a potential customer may use this fact to reject the product with this unique label as a fake.

Figure 8:
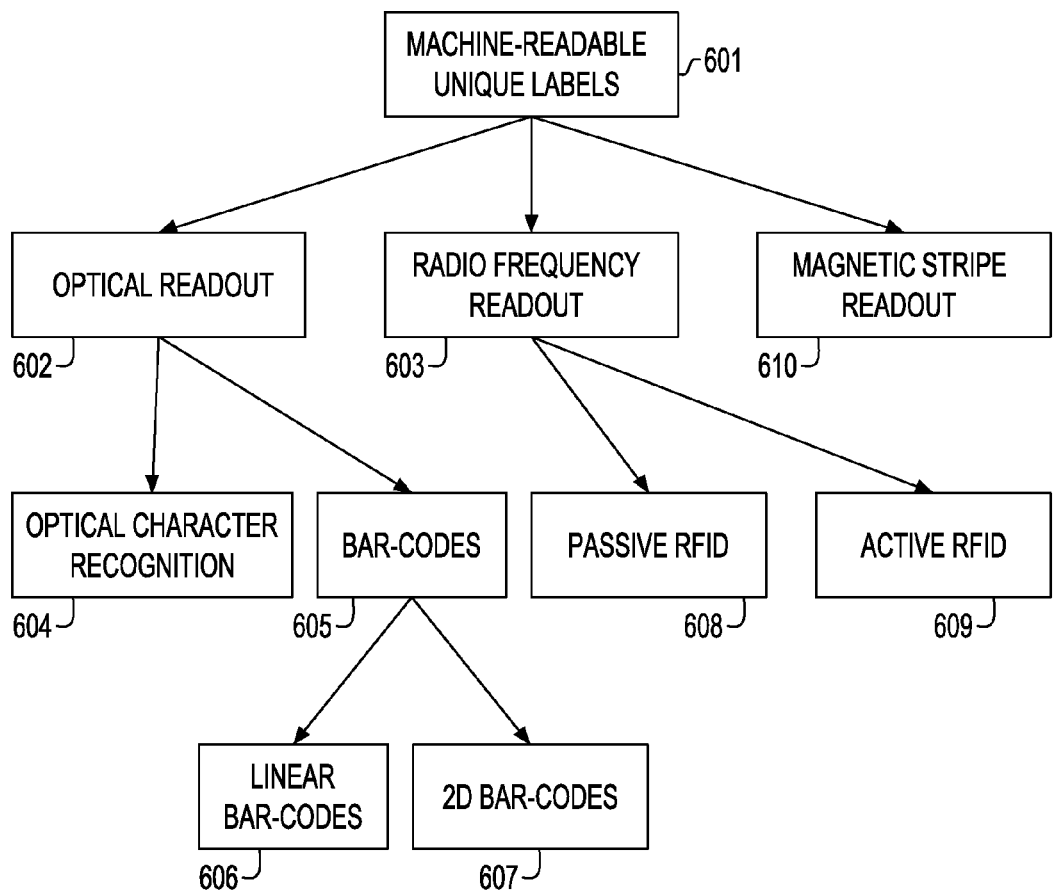
FIG. 8 illustrates possible methodologies for reading unique product and owner labels.

Business practice requires simple and fast input of unique labels into computers. FIG. 8 outlines possible implementations of unique labels 601. The label can be read using optical methods 602, as well as radio frequency methods 603. If the optical method is chosen, the label can be printed as a text and optical character recognition 604 is used to transfer the label to a computer. The label can be a barcode 605 printed as linear barcode 606 or two-dimensional (matrix) barcode 607. If the radio-frequency method is used, the label can be implemented either as passive RFID chip 608 or active RFID chip 609. Also, magnetic stripes 610 (as in credit cards) can be used as unique labels. Optical character recognition 604 is the most preferred embodiment of the present invention. The use of error code correction such as Low Density Parity Check (LDPC) codes or Turbo codes can be used to enhance the accuracy of the optical character recognition.

While the unique product label 102 and unique owner label 105 according to the present invention may be active (for example, containing a chip for transmitting or receiving signals) or passive (for example, containing only printed indicia and having no capability to receive or transmit signals), the most preferred embodiments of the present invention are for the unique product label 102 and unique owner label 105 to be passive because of lower cost and greater convenience of use with typical hand-held devices such as digital cameras, camera cell phones and PDAs. The lower costs and greater convenience of the unique product label 102 and unique owner label 105 make it more likely that the use of the unique product label 102 and unique owner label 105 will become ubiquitous.

Figure 9:
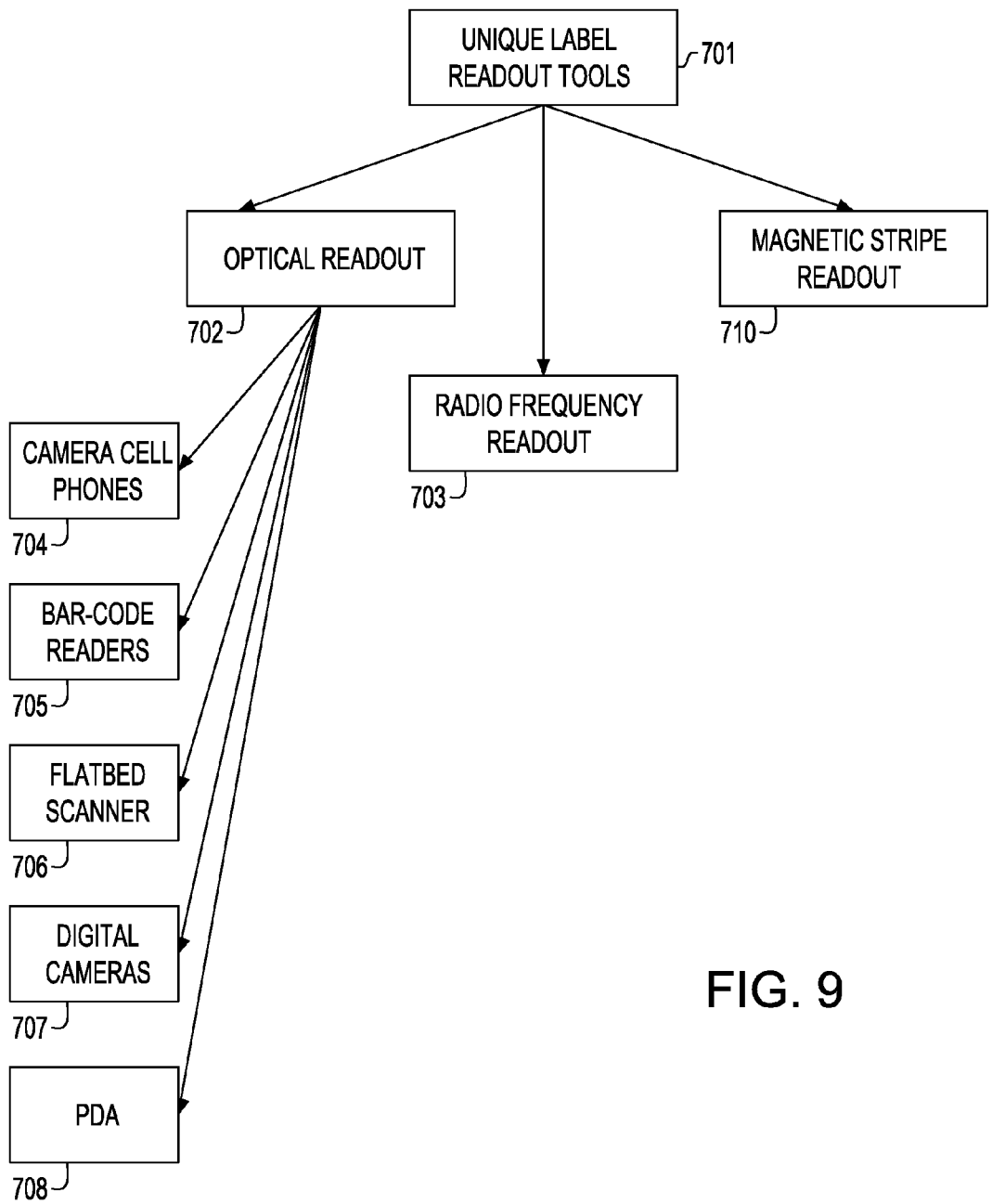
FIG. 9 illustrates possible tools for reading unique product and owner labels.

FIG. 9 gives examples of tools to readout unique labels 701. Tools for optical readout 702 include camera cell phones 704, barcode readers 705 for reading unique labels implemented as barcodes, flatbed scanners 706, digital cameras 707, PDAs 708, etc. Radio frequency readout 703 will use RFID transceivers, and magnetic stripes readout 710 will use magnetic stripe readers. It is preferred to use camera cell phones, digital cameras 707 and PDAs 708 for the present invention.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A method of authenticating an article comprising:
    obtaining an article by a consumer that is produced by a second person, wherein the consumer is not a business;
    providing a personalized physical tag by the second person for the article, the physical tag having printed indicia indicating ownership by the consumer and readable by a person, the physical tag further having a printed digital signature encrypted by a private key and including an encryption of the printed indicia indicating ownership by the consumer;
    reading the printed indicia and printed digital signature with a portable device; and
    validating the printed indicia and printed digital signature using a public key such that the printed indicia matches a decryption of the printed indicia from the printed digital signature.

2. The method of claim 1 wherein the portable device has the public key stored in the portable device and wherein validating the printed indicia and printed digital signature further comprising the step of authenticating the printed indicia and printed digital signature with the public key stored in the portable device.

3. The method of claim 2 further comprising the step of downloading the public key from a database to the portable device.

4. The method of claim of claim 1 wherein validating the printed indicia and printed digital signature further comprising the steps of:
    transmitting the printed indicia and printed digital signature to a database by the portable device;
    authenticating the printed indicia and printed digital signature by the remote database and providing an indication of whether the printed indicia and digital signature are authentic and if the printed indicia matches the decrypted printed indicia in the printed digital signature;
    transmitting the indication to the portable device by the remote database.

5. The method of claim 1 wherein the portable device is a device having wireless capability.

6. The method of claim 5 wherein the portable device is a cell phone camera, a digital camera or a personal digital assistant having a camera.

7. The method of claim 1 wherein the consumer is a purchaser of the article and the second person is a manufacturer of the article.

8. The method of claim 1 wherein the consumer is a purchaser of the article and the second person is a reseller of the article.

9. The method of claim 1 wherein the portable device has optical character recognition capability.

10. The method of claim 1 wherein the article is a brand name article.

11. The method of claim 1 wherein the portable device uses error correcting codes to enhance the accuracy of the reading of the printed indicia and digital signature.

12. The method of claim 1 further comprising providing by the consumer a content of the printed indicia to be included as part of the printed indicia that is provided as a part of the physical tag by the second person.

13. A method of authenticating an article obtained by a consumer that is produced by a second person comprising:
    providing a personalized physical tag by the second person for the article, the physical tag having printed indicia personal to the consumer and readable by a person, the physical tag further having a digital signature authenticating the printed indicia and encrypted by a private key and including an encryption of the printed indicia indicating ownership by the consumer, wherein the consumer is not a business;
    reading the printed indicia and digital signature with a portable device; and
    validating the printed indicia and digital signature using a public key such that the printed indicia matches a decryption of the printed indicia from the digital signature.

14. The method of claim 13 wherein the portable device has the public key stored in the portable device and wherein validating the printed indicia and digital signature further comprising the step of authenticating the printed indicia and digital signature with the public key stored in the portable device and comparing the printed indicia and digital signature.

15. The method of claim 13 wherein validating the printed indicia and digital signature further comprising the steps of:
- transmitting the printed indicia and digital signature to a database by the portable device;
- authenticating the printed indicia and digital signature and comparing the printed indicia and digital signature by the remote database and providing an indication of whether the printed indicia and digital signature are a valid match;
- transmitting the indication to the portable device by the remote database.

16. The method of claim 13 wherein the consumer is a purchaser of the article and the second person is a manufacturer of the article.

17. The method of claim 13 wherein the consumer is a purchaser of the article and the second person is a reseller of the article.

18. The method of claim 13 further comprising providing by the consumer a content of the printed indicia to be included as part of the printed indicia that is provided as a part of the physical tag by the second person.

19. An owner's personalized physical tag provided with an article owned by the owner wherein the owner is a consumer and the consumer is not a business, the owner's personalized physical tag having printed indicia personal to the owner and having a printed digital signature authenticating the printed indicia and encrypted by a private key the printed digital signature including an encryption of the printed indicia indicating ownership by the consumer and authenticating the printed indicia by matching the printed indicia and a decryption of the printed indicia from the printed digital signature, the printed indicia and printed digital signature being readable by a portable device.

20. The owner's physical tag of claim 19 wherein the printed indicia and printed digital signature are readable by optical character recognition.

21. An article having an owner's personalized physical tag provided with the article, the owner's personalized physical tag having printed indicia personal to the owner and having a digital signature authenticating the printed indicia and encrypted by a private key, the digital signature including an encryption of the printed indicia indicating ownership by the consumer and authenticating the printed indicia by matching the printed indicia and a decryption of the printed indicia from the digital signature, the printed indicia and digital signature being readable by a portable device and wherein the owner is a consumer and the consumer is not a business.

22. The article of claim 21 wherein the printed indicia and digital signature are readable by optical character recognition.

23. The method of claim 1 wherein the portable device is an RFID transceiver or a magnetic stripe reader.

* * * * *